United States Patent [19]

Rabo et al.

[11] 4,019,880
[45] Apr. 26, 1977

[54] ADSORPTION OF CARBON MONOXIDE USING SILVER ZEOLITES

[75] Inventors: Jule Anthony Rabo, Armonk; James Nelson Francis, Peekskill; Charles Leslie Angell, Pleasantville, all of N.Y.

[73] Assignee: Union Carbide Corporation, New York, N.Y.

[22] Filed: Aug. 10, 1976

[21] Appl. No.: 713,034

Related U.S. Application Data

[63] Continuation of Ser. No. 617,082, Sept. 26, 1975, abandoned.

[52] U.S. Cl. .................................. 55/68; 55/75; 423/247
[51] Int. Cl.² ...................................... B01D 53/34
[58] Field of Search ............ 55/33, 62, 68, 75, 389; 252/455 Z; 423/247

[56] References Cited

UNITED STATES PATENTS

| 3,789,106 | 1/1974 | Hay | 423/247 |
|---|---|---|---|
| 3,849,340 | 11/1974 | Pollitzer | 252/455 Z |

*Primary Examiner*—Frank A. Spear, Jr.
*Assistant Examiner*—Robert H. Spitzer
*Attorney, Agent, or Firm*—Richard G. Miller

[57] ABSTRACT

Zeolitic molecular sieves having high $SiO_2/Al_2O_3$ molar ratios and containing $Ag^+$ cations are found to exhibit a high degree of selectivity and affinity for CO molecules and are capable of separating CO from gas streams even when water vapor is present.

4 Claims, No Drawings

ADSORPTION OF CARBON MONOXIDE USING SILVER ZEOLITES

RELATED APPLICATIONS

This is a continuation of pending application Serial No. 617,082, filed September 26, 1975, now abandoned.

The present invention relates in general to the method for recovering CO from gas streams, and more particularly to the precess for selectively adsorbing CO from gas streams using zeolitic molecular sieves.

Since carbon monoxide is a product of the incomplete combustion of carbonaceous fuels, it is contained in various amounts in essentially every stack gas stream wherever carbon-containing gases, solids or liquids are burned. Its toxicity to the higher animal forms is well known, and accordingly it constitutes a serious atmospheric pollution problem in industrial areas.

Because of its strong reducing properties, carbon monoxide is a highly useful industrial gas, and is used commerically in the production of methane, phosgene, alcohols, aldehydes, ketones, organic acids and esters. To recover the CO from waste gas streams for use as a chemical reagent, the two methods most commonly employed heretofore are liquifaction and chemical reaction. Liquifaction is suitable only when the CO-containing gas stream has a relatively low concentration of nitrogen since it is not feasible to separate CO from large amounts of nitrogen by liquifaction. Such gas streams must also be essentially free of water vapor and carbon dioxide since these compounds form solids at the temperature conditions involved and would cause plugging of the various apparatus parts.

A recently proposed chemical method involves the use of a composition, $CuAlCl_4$, in an aromatic base to selectively absorb CO from admixture with nitrogen. The absorbing medium is said to "coordinately" complex the CO but not the nitrogen which is dissolved in the medium only slightly. CO is recovered from the CO-enriched medium by raising the temperature and collecting the evolved product. The gas streams suitably treated by this procedure must, however, be treated first to reduce water vapor to extremely low levels since water reacts with the absorbing medium. The necessary drying operation is accomplished using adsorption on zeolitic molecular sieves. A more detailed discission of the aforesaid process is set forth in CHEMTECH, May, 1975, pgs. 308–311.

Another and older chemical method involves adsorption of the CO in aqueous solutions of cuprous salts with the formation of complex ions. Either an acid solution of cuprous chloride or an ammoniacal solution of cuprous carbonate or formate may be employed. The adsorption step is operated at room temperature under a pressure of approximately 200 atm., and carbon monoxide containing the small amount of hydrogen that is soluble in the solution is recovered by releasing the pressure and heating the rich liquor above 40° C. The gas may be concentrated by a second cycle and is then scrubbed with water to remove hydrogen chloride or ammonia, and dried.

Despite the obvious advantages a physical adsorption process would have over the aforesaid liquifaction and chemical methods for recovering CO from waste gas streams, solid adsorbents which exhibit a substantial degree of selectivity for CO have not been available. This is due in part to the small polar character of the CO molecule, and high volatility of CO and the relatively high polarity of $H_2O$ vapor and $CO_2$ commonly present in gas streams being treated for CO recovery.

We have now discovered, however, that CO can be selectively adsorbed for gas streams, even those containing water vapor and $CO_2$, by contacting the said stream at a temperature of from 0° C. to 300° C., preferably 0° C to 200° C., with an adsorbent mass comprising crystalline zeolitic molecular sieves having a framework $SiO_2/Al_2O_3$ molar ratio of from 20 to 200, preferably of from 20 to 100, and containing as structural constituents silver cations. Pressure is not a critical factor.

Since the zeolite adsorbents used in the present process effectively adsorb CO even at very low partial pressures of the adsorbate, both purification and bulk separation adsorption procedures can be carried out. Gas streams containing as little as 10 ppm (volume) of CO can by purified by the present process.

The composition of the gas stream being treated for removal of carbon monoxide is not critical due to the high degree of affinity the silver cation has for CO. The silver cation is not oxidized by air, either wet or dry and hence the ambient air in such places as laboratories, workshops, factories, tunnels and sealed enclosures such as aircraft and spacecraft is an ideal feedstock for purification by the present process. Most commonly the gas stream being treated will contain at least one of $H_2O$, $N_2$, $O_2$ and $CO_2$ in addition to CO. Both $H_2O$ and $CO_2$ are more strongly adsorbed on conventional zeolite adsorbents such as zeolite A and zeolite X and effectively block the adsorption of appreciable quantities of CO. Surprisingly neither of these constituents in a gas stream treated by the present process interferes with CO adsorption.

It will be understood, of course, that although the zeolite adsorbents of the present process have a high affinity for CO as an adsorbate, and are quite tolerant of a wide variety of chemical constituents in the gas streams used as feedstock, it is nevertheless advantageous to avoid the presence of undue amounts of strongly reducing components, particularly hydrogen, which tend to deactivate the zeolite adsorbents by converting the $Ag^+$ cations to metallic silver in cyclic use of the adsorbent mass.

The crystalline zeolitic molecular sieves of the class suitable for use in the practice of this invention are those species which have pore diameters large enough to adsorb CO and which have or are modified to have framework $SiO_2/Al_2O_3$ molar ratios of from 20 to 200, preferably from 20 to 100. A number of synthetic zeolite species are available which have sufficiently high $SiO_2/Al_2O_3$ molar ratios in the as-synthesized form. These include zeolite $\omega$ as defined and disclosed in U.S. Application Ser. No. 655,318, filed July 24, 1967, zeolites ZSM-5, ZSM-8, ZSM-11 and ZSM-12 as disclosed in detail in U.S. Pat. No. 3,702,886. There are also available a variety of techniques for increasing the Si/Al ratios of zeolite species which have not yet been crystallized in forms sufficiently siliceous for use in this invention. One such method involves streaming the zeolite which is at least partially in the hydrogen cation form at temperatures within the range of 800 to 1500° F. followed by extraction of the thus-loosened alumina from the zeolite structure with dilute mineral acids or organic chelating agents. The procedure is defined in detail in U.S. Pat. No. 3,506,400 issued Apr. 14, 1970. Another method in which a partially dicationized form of the zeolite is treated with acetylacetone to extract framework alumina is described in U.S. Pat. No. 3,640,681 issued February 8, 1972. The zeolite having $SiO_2/Al_2O_3$ molar ratios increased by such means to the range of 20 to 200 are satisfactory for the present process.

The silver cation forms of the zeolite adsorbents utilized in the present process are readily prepared by conventional ion-exchange techniques using aqueous solutions of silver salts such as silver nitrate.

EXAMPLE 1.

A sample of zeolite ZSM-5 having a dehydrated chemical composition expressed in terms of mole ratios of oxides of $$0.9\ Na_2O: [Pr_4N]_2O: Al_2O_3: 32\ SiO_2$$

wherein Pr = n-propyl, was calcined at 600° C. in a stream of air to produce the corresponding hydrogen form of the zeolite. Thereafter the zeolite was ion exchanged using an aqueous solution of silver nitrate as the exchange medium. The product zeolite was washed with water to remove the exchange solution, dried at 100° C. in air and activated (dehydrated) at 350° C. for 3 hours, and cooled to room temperature. A fixed bed of the activated zeolite at 22° C. was employed to treat an air stream containing 30 ppm CO and saturated with water vapor at 1 atmosphere and 22° C. The zeolite mass adsorbed 0.5 weight-% CO and reduced the CO content of the product gas to < 10 ppm. Regeneration of the zeolite mass was readily accomplished by purging with dry nitrogen at 200° C.

What is claimed is:
1. Process for removing carbon monoxide from a gas stream comprising at least 10 ppm CO by volume and at least one other constituent selected from the group consisting of $H_2O$ and $CO_2$ which comprises passing said gas stream at a temperature of from 0 to 300° C. through an adsorbent mass of a crystalline zeolitic molecular sieve having a framework $SiO_2/Al_2O_3$ molar ratio of from 20 to 200 and having as zeolitic constituents silver cations, whereby CO molecules are adsorbed and a CO-depleted effluent gas stream is obtained.
2. Process according to claim 1 wherein the framework $SiO_2/Al_2O_3$ molar ratio is from 20 to 100.
3. Process according to claim 2 wherein the gas stream is passed through the adsorbent mass at a temperature of 0° C. to 200° C.
4. Process according to claim 3 wherein the gas stream is air containing at least 10 ppm CO by volume.

* * * * *